US009288997B2

(12) United States Patent
McKee

(10) Patent No.: US 9,288,997 B2
(45) Date of Patent: Mar. 22, 2016

(54) MATCHBOX OVEN

(75) Inventor: Philip R. McKee, Frisco, TX (US)

(73) Assignee: Ovention, Inc., Milwaukee, WI (US)

( * ) Notice: Subject to any disclaimer, the term of this patent is extended or adjusted under 35 U.S.C. 154(b) by 695 days.

(21) Appl. No.: 13/077,143

(22) Filed: Mar. 31, 2011

(65) Prior Publication Data

US 2012/0247445 A1    Oct. 4, 2012

(51) Int. Cl.
| | |
|---|---|
| A21B 1/00 | (2006.01) |
| A21B 1/42 | (2006.01) |
| A21B 1/24 | (2006.01) |
| A21B 1/26 | (2006.01) |

(52) U.S. Cl.
CPC . *A21B 1/42* (2013.01); *A21B 1/245* (2013.01); *A21B 1/26* (2013.01)

(58) Field of Classification Search
CPC .......................................................... A21B 1/26
USPC .......... 126/12 R, 21 R; 99/443 R, 443 C, 386
See application file for complete search history.

(56) References Cited

U.S. PATENT DOCUMENTS

| | | | | |
|---|---|---|---|---|
| 3,910,175 | A | * | 10/1975 | Smith ............................ 99/474 |
| 4,244,284 | A | | 1/1981 | Flavan, Jr. |
| 4,556,043 | A | | 12/1985 | Bratton |
| 5,153,402 | A | | 10/1992 | Quick |
| 5,277,105 | A | | 1/1994 | Bruno et al. |
| 5,717,192 | A | | 2/1998 | Dobie et al. |
| 5,771,786 | A | | 6/1998 | Chung |
| 5,826,496 | A | * | 10/1998 | Jara ............................. 99/443 C |
| 6,140,626 | A | | 10/2000 | McKee et al. |
| 6,369,360 | B1 | * | 4/2002 | Cook ............................ 219/388 |
| RE37,706 | E | | 5/2002 | Chung |
| 6,541,739 | B2 | | 4/2003 | Shei et al. |
| 6,880,545 | B2 | | 4/2005 | Heber et al. |
| 7,004,159 | B1 | | 2/2006 | Carpenter |
| 7,381,927 | B1 | * | 6/2008 | Agnello ........................ 219/388 |
| 2002/0121509 | A1 | | 9/2002 | Shei |
| 2004/0144260 | A1 | | 7/2004 | Backus et al. |
| 2005/0132899 | A1 | | 6/2005 | Huang et al. |
| 2005/0205547 | A1 | * | 9/2005 | Wenzel ........................ 219/388 |
| 2007/0137633 | A1 | * | 6/2007 | McFadden .................. 126/21 A |
| 2007/0295325 | A1 | | 12/2007 | Esparza |
| 2008/0067166 | A1 | * | 3/2008 | Yoder et al. .................. 219/413 |
| 2008/0156201 | A1 | | 7/2008 | Cook et al. |

(Continued)

FOREIGN PATENT DOCUMENTS

CN           1301477 A    6/2001

OTHER PUBLICATIONS

McKee, Philip—U.S. Appl. No. 13/236,695, filed Sep. 20, 2011.

(Continued)

*Primary Examiner* — Avinash Savani
*Assistant Examiner* — Aaron Heyamoto
(74) *Attorney, Agent, or Firm* — Quarles & Brady LLP

(57) ABSTRACT

A matchbox oven is disclosed. The matchbox oven includes a housing, a slider, a motor and a heat source. The housing includes a cavity and a first and second openings. The slider, which is configured for receiving food items, includes multiple stoppers serve as oven covers to prevent heat within the cavity from escaping through the first and second openings. The slider can be moved in and out of the cavity through the first and second openings by a motor. The heat source provides heat to the cavity for heating up any food item placed on a portion of the slider located within the cavity.

30 Claims, 5 Drawing Sheets

(56) References Cited

U.S. PATENT DOCUMENTS

| | | |
|---|---|---|
| 2008/0216812 A1 | 9/2008 | Dougherty |
| 2009/0090252 A1 | 4/2009 | Ewald et al. |
| 2011/0114634 A1 | 5/2011 | Nevarez |
| 2012/0247445 A1 | 10/2012 | McKee |
| 2013/0213380 A1* | 8/2013 | McKee ................ 126/21 R |

OTHER PUBLICATIONS

Supplemental European Search Report; PCT/US2012051276; dated Mar. 19, 2015; 6 pages.

International Search Report; PCT/US 12/51276; dated Feb. 11, 2012; 21 pages.

* cited by examiner

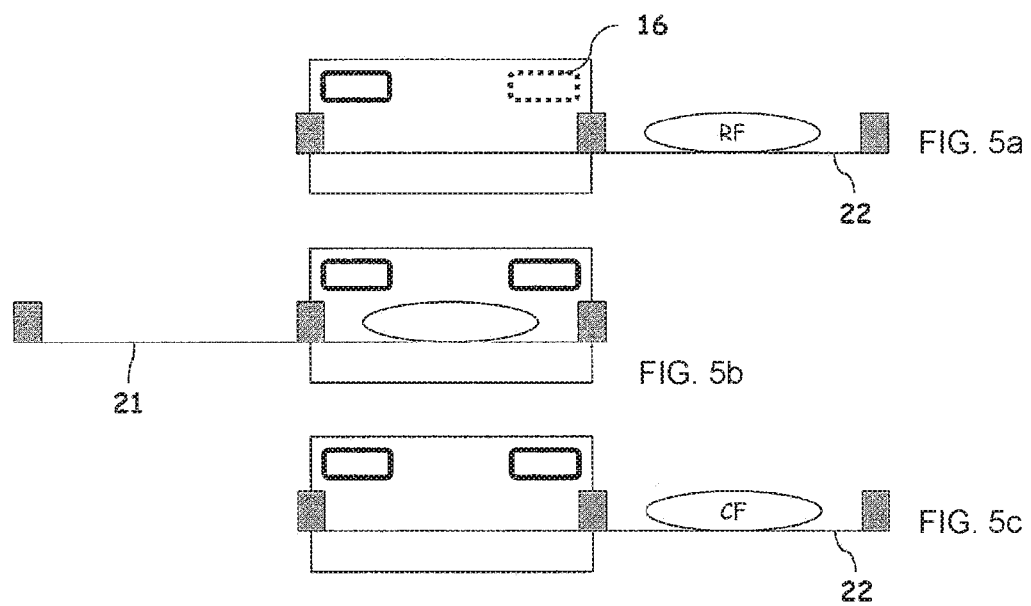

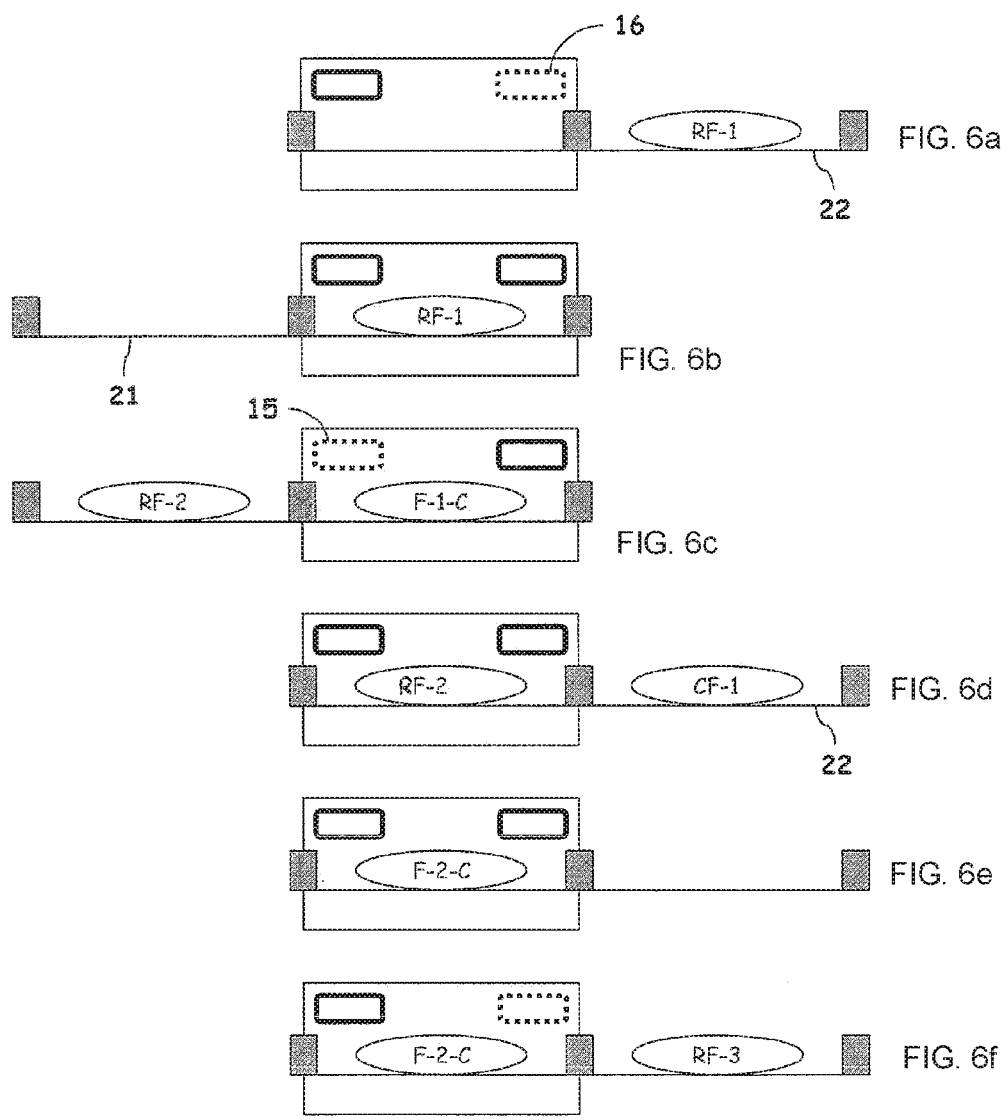

MATCHBOX OVEN

BACKGROUND OF THE INVENTION

1. Technical Field

The present invention relates to ovens in general, and in particular to a matchbox oven capable of providing continuous food cooking while minimizing heat loss, thereby minimizing energy consumption.

2. Description of Related Art

A conveyor oven typically has a first opening through which uncooked food enters and a second opening at the opposite end of the oven through which cooked food exits. A stainless steel conveyor belt is commonly used to carry food items through a heated cavity between the first and second openings. The conveyor belt extends past both openings sufficiently to allow safe insertion and retrieval of food items. This arrangement allows food items to be placed on the conveyor belt on a continuous basis to achieve sequential steady-state cooking. The only limit to how many substantially identical food items may be placed in the conveyor oven is the speed of the conveyor belt, which correlates to the residence time inside the heated cavity for food items to be sufficiently cooked.

When food items offered by a commercial foodservice operation such as a restaurant are to be cooked at the same temperature for the same amount of time, a conveyor oven is particularly advantageous. The operator need only set the temperature and conveyor belt speed as necessary to cook the selected foods. Once these two parameters are set, the oven may be operated continuously without any further adjustments. Even a person unskilled in the art of cooking is able to prepare high-quality cooked food products simply by placing them on the conveyor belt of a conveyor oven. The ease of operation and high throughput make conveyor ovens highly desirable in restaurants and other commercial foodservice settings.

However, conveyor ovens also have their disadvantages. For example, most commercial foodservice operations offer a variety of food items, such as pizza, chicken, vegetables and pie, which require a wide range of cooking times and heat transfer profiles. Even a single food order at a restaurant may include a variety of food items, and different food items require different cooking times. Conveyor ovens are very efficient when cooking similar food items, but not for cooking a variety of food items that require vastly different cooking times and heat transfer profiles. In addition, the two openings contribute to tremendous heat loss during the operation of conveyor ovens. The lost heat must be replaced in order to maintain cook temperature, and as a result conveyer ovens are not energy efficient.

Consequently, it would be desirable to provide an improved oven with the efficiency of conveyor ovens while enabling different cooking times, all without a large amount of heat loss associated with conveyor ovens.

SUMMARY OF THE INVENTION

In accordance with a preferred embodiment of the present invention, an oven includes a housing, a slider, a mover and a heat source. The housing includes a cavity and a first and second openings. The slider includes a first and second platforms configured for receiving food items, and a first, second and third stoppers that serve as oven covers to prevent heat within the cavity from escaping through the first and second openings. The slider can be moved in and out of the cavity through the first and second openings by the mover such that one of the platforms is generally inside the cavity and other platform is generally outside the cavity where it can receive a food item. The heat source provides heat to the cavity to heat up any food item placed on a portion of the slider located within the cavity.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 5a-5c illustrate a method of cooking when only one of food loading sections of the matchbox oven from FIG. 1 is being used, in accordance with a preferred embodiment of the present invention; and FIGS. 6a-6f illustrate a method of cooking when both food loading sections of the matchbox oven from FIG. 1 are being used, in accordance with a preferred embodiment of the present invention.

DETAILED DESCRIPTION OF A PREFERRED EMBODIMENT

Figure 1:
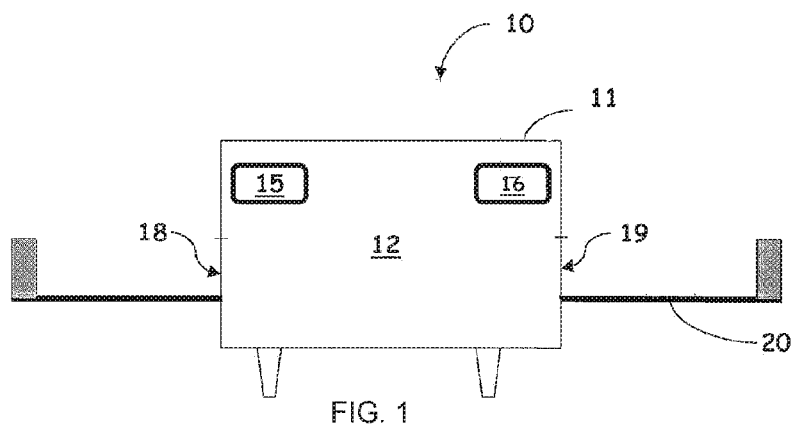
FIG. 1 is a front view of a matchbox oven, in accordance with a preferred embodiment of the present invention.

Referring now to the drawings and in particular to FIG. 1, there is depicted a front view of a matchbox oven, in accordance with a preferred embodiment of the present invention. As shown, a matchbox oven 10 is defined by a housing 11 having a cavity 12. Housing 11, as well as cavity 12, has a first opening 18 and a second opening 19. Matchbox oven 10 includes a heating and airflow system (not shown) to supply heat to cavity 12 for heating up any food items that have been carried into cavity 12 from either first opening 18 or second opening 19 via a slider 20.

Matchbox oven 10 also includes a first control panel 15 and a second control panel 16. First and second control panels 15, 16 are preferably implemented with touchscreens but they can also be implemented with keypads and liquid crystal displays (LCDs). An operator can enter commands, such as cooking temperature within cavity 12, cooking time, blower speed, etc., via first and second control panels 15, 16 to effectuate cooking controls on any food items placed within cavity 12.

Figure 2:
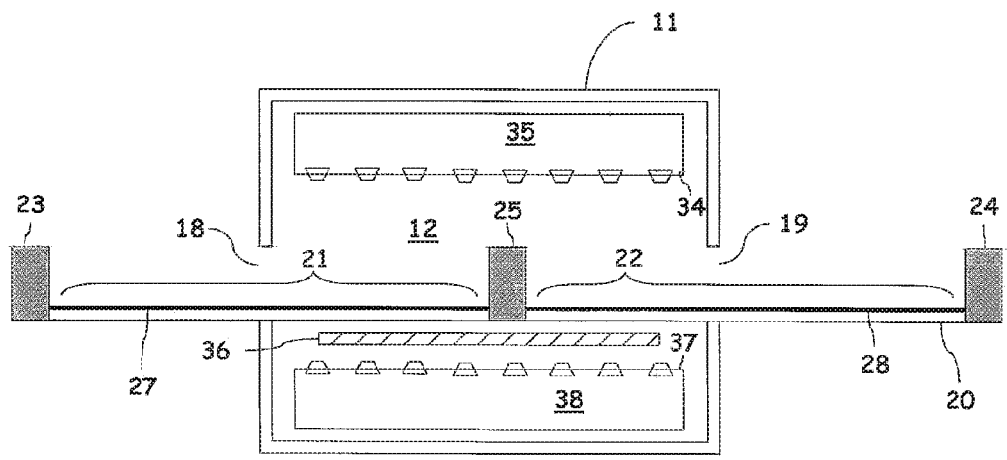
FIG. 2 is a cross-sectional view of a cavity within the matchbox oven from FIG. 1, in accordance with a preferred embodiment of the present invention.

With reference now to FIG. 2, there is depicted a cross-sectional view of housing 11, in accordance with a preferred embodiment of the present invention. As shown, housing 11 accommodates slider 20 having a first food loading section 21 and a second food loading section 22. The surfaces of first and second food loading sections 21, 22 are substantially planar. First and second food loading sections 21, 22 are configured to receive cooking plates 27, 28, respectively. Any food item intended to be cooked by matchbox oven 10 is initially placed on either one of cooking plates 27, 28. Cooking plates 27, 28 can be identical or different from each other, depending on the types of food items to be prepared. Thus, cooking plate 27 may be made of a different material and/or a different design from cooking plate 28.

Slider 20 also includes a first stopper 23, a second stopper 24 and a third stopper 25. Third stopper 25 serves as a divider between first and second food loading sections 21, 22 as well as an oven cover to prevent heat within cavity 12 from escaping through openings 18, 19. Along with third stopper 25, first and second stoppers 23, 24 serve as oven covers to prevent heat within cavity 12 from escaping through openings 18, 19, depending on the placement of slider 20 in relation to cavity 12. For example, first and third stoppers 23, 25 can serve as oven covers for first and second openings 18, 19, respectively. Similarly, third and second stoppers 25, 24 can serve as oven covers for first and second openings 18, 19, respectively.

Slider 20 is connected to a stepper motor (not shown) that powers the linear movement of slider 20 within cavity 12. Although slider 20 is moved by a stepper motor, it is understood by those skilled in the art that slider 20 can also be moved manually via a lever system or by a variety of other motorized movement designs.

In addition, housing 11 also contains a top plenum 35 and a bottom plenum 38. Top plenum 35 is connected to a top nozzle plate 34. Bottom plenum 38 is connected to a bottom nozzle plate 37. Top nozzle plate 34, top plenum 35, bottom nozzle plate 37 and bottom plenum 38 are part of the heating and airflow system for matchbox oven 10 such that heated air in top plenum 35 and bottom plenum 38 are in gaseous communication with cavity 12 through top nozzle plate 34 and bottom nozzle plate 37, respectively. Top nozzle plate 34 and bottom nozzle plate 37 include multiple conical shape nozzles for directing hot pressured airstream towards any food items placed on the portion of slider 20 located within cavity 12. Although air passes through top nozzle plate 34 and bottom nozzle plate 37 into cavity 12, it is understood by those skilled in the art that top plenum 35 or bottom plenum 38 could be in gaseous communication with cavity 12 via a variety of air opening configurations such as tubes, rectangular openings and the like. Moreover, air can enter cavity 12 through only one of top plenum 35 or bottom plenum 38.

For additional heating, an optional infrared radiation heating element 36 can be placed within cavity 12 somewhere between slider 20 and bottom nozzle plate 37 or between slider 20 and top nozzle plate 34 for supplying heat towards any food located on first loading section 21 or second loading section 22 of slider 20. Although an infrared radiation heating element is being used in the current embodiment, it is understood by those skilled in the art that other heating systems, such as microwave, steam or a combination thereof, are also applicable to the present invention.

Figure 3:
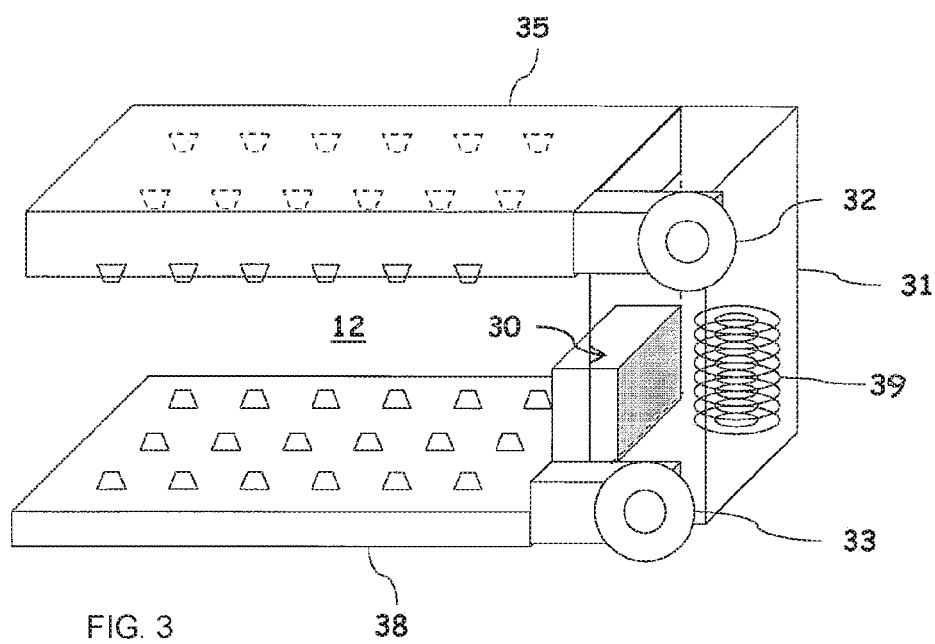
FIG. 3 is a diagram of a heating and airflow system within the matchbox oven from FIG. 1, in accordance with a preferred embodiment of the present invention.

Referring now to FIG. 3, there is depicted a diagram of the heating and airflow system within matchbox oven 10, in accordance with a preferred embodiment of the present invention. Air within cavity 12 is initially pumped in to a heater plenum 31 via an intake opening 30. Heater plenum 31 includes a heater 39. After it has been sufficiently heated by heater 39, the hot air is then directed to top plenum 35 via a top blower 32 and to bottom plenum 38 via a bottom blower 33. The pressurized hot air formed within top plenum 35 is subsequently directed to cavity 12 via multiple nozzles located on top nozzle plate 34 (from FIG. 2). Similarly, pressurized hot air formed within bottom plenum 38 is subsequently directed to cavity 12 via multiple nozzles located on bottom nozzle plate 37 (from FIG. 2). Although heated air is shown to be sent to top air plenum 35 and bottom plenum 38 via separate blowers, it is understood by those skilled in the art that heated air can be sent to both top plenum 35 and bottom plenum 38 via a single blower.

Figure 4A:
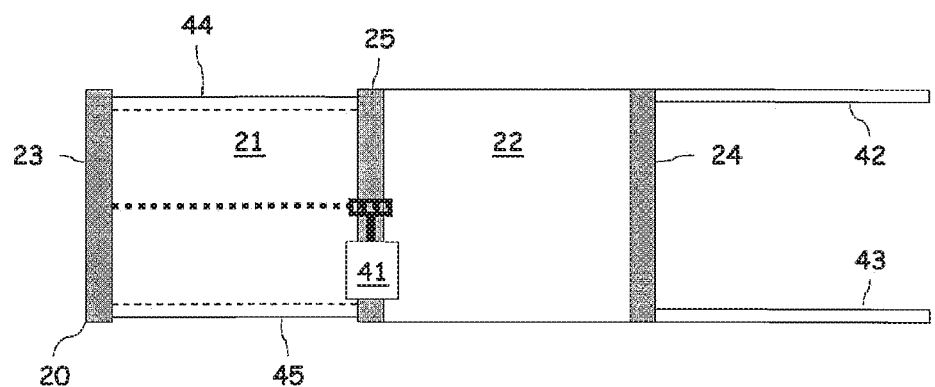
FIGS. 4a-4c are a top view and side views of the slider within the matchbox oven from FIG. 1, in accordance with a preferred embodiment of the present invention.

With reference now to FIG. 4a, there is depicted a top view of slider 20, in accordance with a preferred embodiment of the present invention. As shown, slider 20, which includes first and second food loading sections 21-22 and stoppers 23-25, is supported by a first pair of rails 42, 43 and a second pair of rails 44, 45. The linear movement of slider 20 on top of rails 42, 43 is preferably powered by a stepper motor 41. The widths of stoppers 23-25, which are preferably the same, are wider than the thickness of openings 18, 19. Thus, two of stoppers 23-25 can serve as oven covers to prevent heat within cavity 12 from escaping through openings 18, 19, depending on the placement of slider 20 in relation to cavity 12. Although three stoppers 23-25 are shown in the preferred embodiment, it is possible to employ less than three stoppers on slider 20 at the expense of a higher heat loss from cavity 12.

Figure 4B:
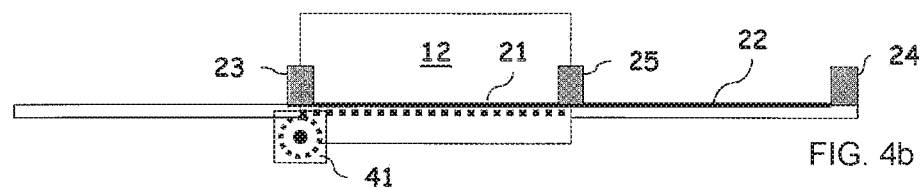
Figure 4C:
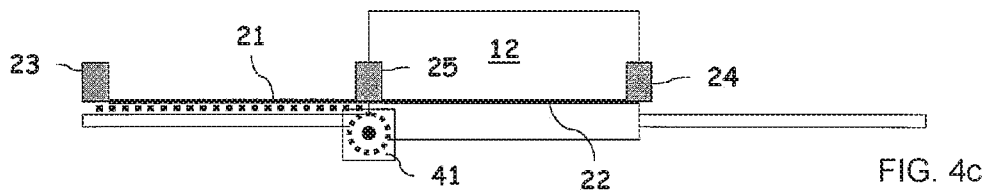

With reference now to FIGS. 4b-4c, there are depicted two side views of slider 20, in accordance with a preferred embodiment of the present invention. In FIG. 4b, first food loading section 21 is shown to be located within cavity 12, with first and third stoppers 23, 25 positioned centrally within first and second openings 18, 19, respectively. In this position, first and third stoppers 23, 25 serve as oven covers for first and second openings 18, 19, respectively. In FIG. 4c, second food loading section 22 is shown to be located within cavity 12, with third and second stoppers 25, 24 positioned centrally within first and second openings 18, 19, respectively. In this position, third and second stoppers 25, 24 serve as oven covers for first and second openings 18, 19, respectively.

In FIGS. 4b-4c, stoppers 23-25 are shown to be positioned centrally within openings 18-19. However, during a cooking cycle, slider 20 can be moved to-and-fro slightly and repeatedly to allow the edges of two of stoppers 23-25 to flush with openings 18-19 of housing 11. Such movements are designed to avoid overheating of a food item at any spot located directly underneath a nozzle. The distance within which slider 20 can be moved to-and-fro is preferably dictated by the widths of stoppers 23-25 in order to avoid heat loss from cavity 12 during such movements.

Referring now to FIGS. 5a-5c, there are illustrated a method of cooking when only one of food loading sections 21, 22 of slider 20 is used, in accordance with a preferred embodiment of the present invention. An uncooked raw food item (RF) is initially placed on food loading section 22 (or 21), as shown in FIG. 5a. An operator then enters an appropriate cook settings for cooking the food item via control panel 16 (or 15), and food loading section 22 (or 21) is subsequently moved within cavity 12, as depicted in FIG. 5b. After a period of time has lapsed, food loading section 22 (or 21) exits cavity 12, and the fully cooked food item (CF) is ready to be removed from food loading section 22 (or 21) by an operator, as shown in FIG. 5c.

With reference now to FIGS. 6a-6f, there are illustrated a method of cooking when both food loading sections 21, 22 of slider 20 are being used, in accordance with a preferred embodiment of the present invention. A first uncooked raw food item (RF-1) is initially placed on food loading section 22, and an operator then enters an appropriate cook setting for cooking the first food item via control panel 16, as shown in FIG. 6a. Food loading section 22 is subsequently moved inside cavity 12, as depicted in FIG. 6b. While the first food item is being cooked (F-1-C), a second uncooked raw food item (RF-2) can be placed on food loading section 21, and the operator enters an appropriate cook settings for cooking the second food item via control panel 15, as depicted in FIG. 6c.

After a period of time has lapsed, food loading section 22 on which the first food item is fully cooked (CF-1) exits cavity 12 while food loading section 21 is moved inside cavity 12, as shown in FIG. 6d. While the second food item is being cooked (F-2-C), the fully cooked first food item (CF-1) is ready to be removed by the operator from food loading section 22, as shown in FIG. 6e.

While the second food item is being cooked (F-2-C), a third uncooked raw food item (RF-3) can be placed on food loading section 22, and the operator enters an appropriate cook settings for cooking the third food item via control panel 16, as depicted in FIG. 6f.

The above-mentioned sequence can be performed repeatedly for different food items. Since different cooking times can be entered by an operator, any of the above-mentioned food items can be completely different from each other.

As has been described, the present invention provides a matchbox oven for continuously and efficiently cooking a wider variety of food items while minimizing heat loss, resulting in improved energy efficiency.

While the invention has been particularly shown and described with reference to a preferred embodiment, it will be understood by those skilled in the art that various changes in form and detail may be made therein without departing from the spirit and scope of the invention.

What is claimed is:

1. An oven comprising:
a housing having a cavity, a housing cavity length, and first and second openings defining the housing cavity length;
a slider comprising a surface for receiving food items, said slider having a slider length greater than said housing cavity length, a rigid surface, and three stoppers, one stopper attached on each end of said slider and one stopper attached on or near the middle of said slider,
said slider is configured to be moved to a position in said cavity such that two of said plurality of stoppers cover said first and second openings to prevent heat within said cavity from escaping through said first and second openings;
a mover operatively connected to said slider to linearly move said surface bidirectionally only in a single axis and a single plane, causing food items placed on said slider to be moved in and out of said cavity through said first opening and in and out of said cavity through said second opening; and
a heat source for providing heat to said cavity for heating up any food item placed on a portion of said slider located within said cavity.

2. The oven of claim 1, wherein said plurality of stoppers includes first, second and third stoppers.

3. The oven of claim 1, wherein said oven includes first and second control panels.

4. The oven of claim 1, wherein said oven includes an air intake for receiving air from said cavity.

5. The oven of claim 4, wherein said oven includes a heater for heating air received from said air intake.

6. The oven of claim 5, wherein said oven includes a blower for returning heated air to said cavity.

7. The oven of claim 6, wherein said oven includes a first plenum and a first nozzle plate having at least one opening through which heated air enters said cavity.

8. The oven of claim 7, wherein said cavity includes a second plenum and a second nozzle plate having at least one opening through which heated air enters said cavity.

9. The oven of claim 1, wherein said cavity includes an infrared radiation heating element.

10. The oven of claim 1, wherein said slider includes a first food loading section located between first and second ones of said plurality of stoppers, and a second food loading section located between said second one and a third one of said plurality of stoppers.

11. The oven of claim 10, wherein said first and second food loading sections include substantially identical cooking plates.

12. The oven of claim 10, wherein said first and second food loading sections include different cooking plates.

13. The oven of claim 1, wherein said mover is a stepper motor.

14. The oven of claim 1, wherein said mover moves said slider to-and-fro within the width of one of said plurality of stoppers during a cooking cycle.

15. The oven of claim 1, wherein said oven does not comprise doors on said housing for covering said first and second openings.

16. An oven comprising:
a housing having a cavity and first and second openings;
a surface that is linearly movable only in a single axis and a single plane, wherein a first portion of said surface is located substantially within said cavity when a second portion of said surface is located substantially outside said cavity and said first portion of said surface is located substantially outside said cavity when said second portion of said surface is located substantially within said cavity, and further comprising a plurality of stoppers attached onto the surface, wherein two of said stoppers substantially block said first and second openings when one of said first and second portions of said surface is located within said cavity;
a heat source for providing heat to said cavity for heating up any food item placed on one of said first and second portions of said surface located within said cavity; and
a controller for applying a first cook setting to said oven when said first portion of said surface is within said cavity, and for applying a second cook setting to said oven when said second portion of said surface is within said cavity, wherein said first cook setting and said second cook setting are independent of each other.

17. The oven of claim 6, further comprising a mover operatively connected to said surface to linearly move said surface in and out of said cavity through said first and second openings.

18. The oven of claim 16, wherein food items placed on said surface are moved in and out of said cavity through said first opening and in and out of said cavity through said second opening.

19. The oven of claim 17, wherein said mover comprises a stepper motor.

20. The oven of claim 17, wherein said mover moves said surface to-and-fro during a cooking cycle.

21. The oven of claim 16, wherein said controller comprises:
a first control panel for entering said first cook setting; and
a second control panel for entering said second cook setting.

22. The oven of claim 16, wherein:
said first portion of said surface comprises a first food loading section; and
said second portion of said surface comprises a second food loading section.

23. The oven of claim 16, wherein oven does not comprise doors on said housing for covering said first and second openings.

24. An oven comprising:
a housing having a cavity and first and second openings;
a slider comprising a surface that is linearly movable only in a single axis and a single plane and that includes a first food loading section and a second food loading section each for carrying food items, wherein said first food loading section linearly moves into said cavity through said first opening and said second food loading section linearly moves into said cavity through said second opening, and wherein one of said first and second food loading sections is located outside of said cavity when the other one of said first and second food loading sections is located within said cavity;
a plurality of stoppers attached onto the slider, wherein two of said plurality of stoppers substantially block said first and second openings when one of said first and second food loading sections is located within said cavity; and
a heat source for providing heat to said cavity for heating up any food item placed on one of said first and second food loading sections located within said cavity,
wherein said heat source is controlled by a first cook setting of said oven when said first food loading section is within said cavity and by a second cook setting of said oven when said second food loading section is within said cavity, and the first and second cook settings are independently controllable.

25. The oven of claim 24, further comprising:
a first control panel for entering said first cook setting; and
a second control panel for entering said second cook setting.

26. The oven of claim 24, wherein said plurality of stoppers includes a divider between said first and second food loading sections.

27. The oven of claim 24, further comprising a mover operatively connected to said slider to linearly move said slider in and out of said cavity through said first and second openings.

28. The oven of claim 27, wherein said mover comprises a stepper motor.

29. The oven of claim 27, wherein said mover moves said slider to-and-fro during a cooking cycle.

30. The oven of claim 24, wherein oven does not comprise doors on said housing for covering said first and second openings.

* * * * *